May 16, 1967     L. G. WRIGHT     3,320,577

DOPPLER NULLIFICATION APPARATUS

Filed May 25, 1965

INVENTOR.
LAWRENCE G. WRIGHT
BY

ATTORNEYS

United States Patent Office 3,320,577
Patented May 16, 1967

3,320,577
DOPPLER NULLIFICATION APPARATUS
Lawrence G. Wright, Glen Burnie, Md., assignor, by mesne assignments, to the United States of America as represented by the Secretary of the Navy
Filed May 25, 1965, Ser. No. 458,799
1 Claim. (Cl. 340—5)

The present invention relates to a sonar apparatus and more particularly, to apparatus for eliminating the Doppler shift produced by own ship's speed.

Many sonar systems accomplish own doppler nullification (ODN) by operating on a received signal. However, at the present time no system is known that eliminates Doppler shift, caused by own ship's speed, by operating on the transmitted signal from the sonar system.

An object of the present invention is to provide an improved means for eliminating Doppler shift.

Another object of the persent invention is to provide an improved efficient means for eliminating Doppler shift, due to own ship's speed, by operating on a transmitted signal.

A further object of the present invention is to provide analog system for eliminating Doppler shift caused by own ship's speed.

A further object of the persent invention is to provide computing apparatus for computing a function which is utilized to eliminate Doppler shift due to own ship's speed.

Figure 1:
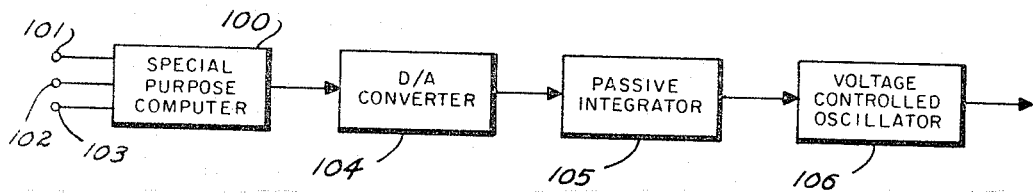
Figure 2:
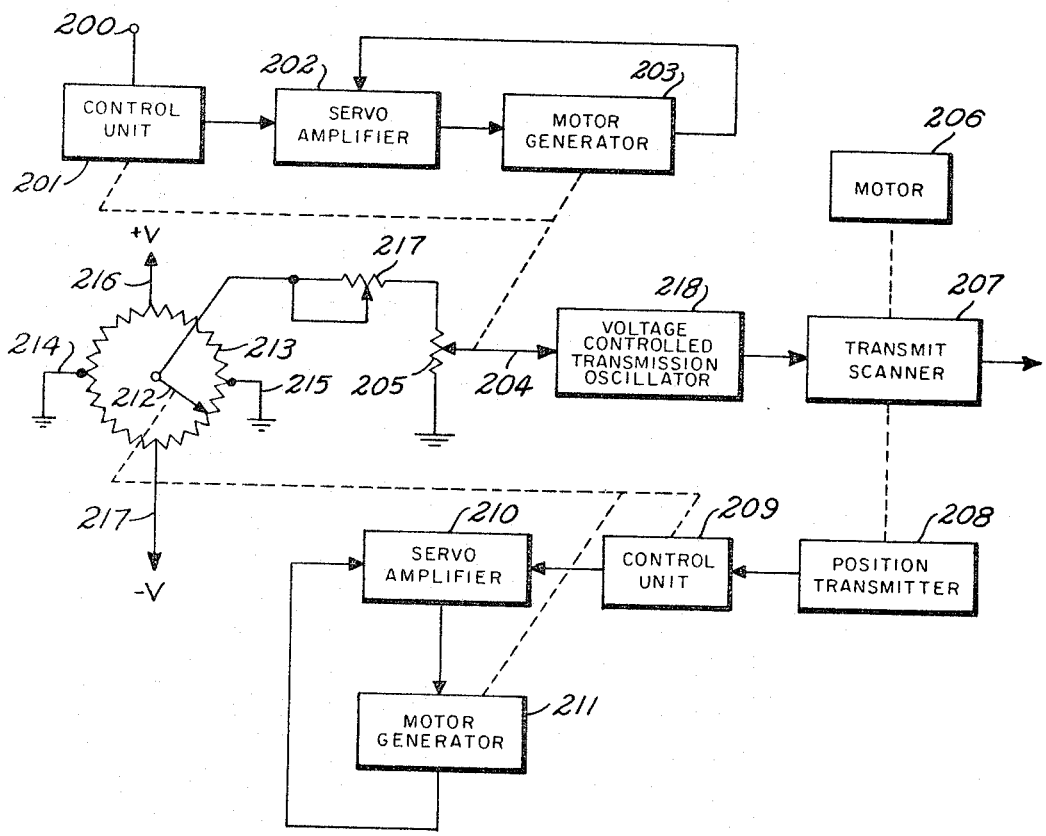

Other objects and many of the attendant advantages of this invention will be readily appreciated as the same becomes better understood by reference to the following detailed description when considered in connection with the accompanying drawings wherein:

FIG. 1 illustrates one embodiment of the invention incorporating a special purpose computer; and FIG. 2 is a block diagram of another embodiment incorporating analog apparatus.

The embodiments of the invention described accomplish ODN (own Doppler nullificsation) during transmission either using a special purpose computer or an analog system which is adapted for use in any steered beam sonar transmission system. In order to eliminate the effect of Doppler shift due to own ship's speed, the transmitted frequency is determined by the following equation:

$$f_T = f_R\left(1 - \frac{2V}{C}\cos\theta\right)$$

where:

$f_T$=transmitted frequency
$f_R$=desired center frequency (that which would indicate a stationary target)
$V$=ship's speed
$C$=speed of sound in water
$\theta$=direction of transmission measured clockwise from own ship's bow.

FIG. 1 illustrates an embodiment of the invention incorating a special purpose computer which is used to compute a frequency determining control voltage. The output from a special purpose computer 100 having inputs 101, 102 and 103 is coupled to a digital-to-analog converter 104. Ship's speed, sound velocity and start of transmit are coupled in at inputs 101 through 103, respectively, to the special purpose computer. The computer 100 calculates the Doppler corrections using ship's speed and sound velocity inputs.

In the system it is assumed that the transmission always starts and stops on the same relative bearings and the transmit canning rate is a known constant. After receiving a start of transmit signal at input 103, the computer 100 calculates Doppler corrections at each 1.8° interval. The computer produces a digital output which is coupled to the digital-to-analog converter 104 for conversion to an analog voltage. The output of the digital-to-analog converter is coupled as an input to a passive integrator 105 the output of which is coupled to an input of a voltage controlled oscillator 106 which produces the frequency $f_T$. The output of the voltage control oscillator 106 is coupled to a transmit scanner and power amplifiers in the sonar system, not shown.

The analog output of the digital-to-analog converter 104 is filtered to provide a smooth control voltage for the variable frequency transmission oscillator 106. The output frequency of the oscilaltor is a function of the applied control voltage and corresponds to $f_T$.

FIG. 2 illustrates an embodiment of the invention which is adapted for use with any scanned or steered beam sonar transmission system. An input corresponding to own ship's speed is coupled in at 200 from the own ship's log. This input is coupled to a control unit 201 of a servo system comprising a servo amplifier 202 and motor generator 203. The output of the control unit 201 is coupled to the input of the servo amplifier 202 the output of which is coupled to the motor generator 203. An electrical output of the motor generator is coupled back to the servo amplifier. The motor generator is mechanically coupled to a wiper arm 204 on a potentiometer 205 and also coupled to the control unit 201.

Another motor 206 is mechanically coupled to a transmit scanner 207 which has a mechanical output coupled to a position transmitter 208. The position transmitter 208 provides an electrical output which is coupled to another control unit 209 the output of which is coupled to another servo amplifier 210. The output of the servo amplifier is coupled to motor generator 211 which in turn has an output coupled back to the servo amplifier 210.

The motor generator 211 is mechanically coupled to the control unit 209 and a wiper arm 212 of a rheostat 213. The wiper arm 212 on rheostat 213 is thusly positioned in accordance with the direction of transmission at any given instant of time. Rheostat 213 is connected to ground at diametrically opposed points 214 and 215 and a source of voltage +V and −V at diametrically opposed points 216 and 217 which are displaced by 90° with respect to the ground points.

The wiper arm 212 is electrically coupled to potentiometer 217 the wiper arm of which is adapted to short out a portion of the potentiometer under the control of an operator. The output of potentiometer 217 is coupled to one end of potentiometer 205 the other end of which is coupled to ground.

Wiper arm 204 is coupled to the input of a voltage controlled oscillator 218 and the output of the oscillator is coupled to the input of the transmit scanner 207. The output of the transmit scanner corresponds to $f_T$.

In operation, the transmit scan rate is picked off by the control transmitter 208 which, in turn, is used to control the motor generator 211 which causes the wiper arm 212 to rotate in synchronism with the transmit scanner 207. The rheostat 213 is divided into four quadrants to provide sign information and wound to produce an output voltage corresponding to a cosine $\theta$ function. The cosine $\theta$ function is modified by the manually adjusted wiper arm on potentiometer 217 to compensate for differences in sound velocity in the water medium. This is done under operator control.

Simultaneously, the input from the ship's log is used to cause the wiper arm 204 to move on potentiometer 205 so that the cosine $\theta$ function is further modified by the ship's velocity. The ultimate voltage at the wiper of 204 is then proportional to the ship's speed, velocity of sound in water and the direction of transmission picked off from the transmit scanner 207.

This voltage, proportional to $$\left(1 - \frac{2V}{C} \cos \theta\right)$$

is then used as the input to the voltage controlled oscillator 218 to produce the function $$f_R\left(1 - \frac{2V}{C} \cos \theta\right)$$

Obviously many modifications and variations of the present invention are possible in the light of the above teachings. It is therefore to be understood that within the scope of the appended claim the invention may be practiced otherwise than as specifically described.

What is claimed is:

Apparatus for eliminating system Doppler in a moving system including a transmitting means and a speed measuring element for determining system speed comprising:
input means adapted to receive a signal from the speed measuring element representative of system speed;
speed function means operatively coupled to said input means and adapted to be adjusted in accordance with system speed derived from said input means;
said speed function means comprising a wiper on a potentiometer which is positioned in accordance with system speed coupled in from said input means;
direction function means for producing a function corresponding to direction of transmission;
said direction function means being operatively coupled to said transmitting means and being adjusted in accordance with the azimuthal position of said transmitting means;
said direction function means comprising a rheostat divided into four quadrants;
said rheostat being center tapped to ground at two points diametrically opposed;
said rheostat having inputs corresponding to plus and minus voltages connected at opposite points 90° displaced with respect to said center tap points;
speed of sound adjusting means operatively connected to said speed function means and said direction function means for producing a function representative of speed of sound under control of an operator;
said speed of sound adjusting means comprising a manually adjustable potentiometer which is adjusted to compensate for changes in the velocity of sound in water;
combining means operatively coupled to said direction function means and speed of sound function means for producing an output corresponding to $$\left(1 - \frac{2V}{C} \cos \theta\right)$$

where C equals the speed of sound in water, V equals system speed and $\theta$ equals direction of transmission measured with respect to the system;
a voltage controlled oscillator having an input and an output;
the input to said voltage controlled oscillator being operatively connected to the output of said combining means;
said voltage controlled oscillator having a normal frequency of oscillation corresponding to $f_R$ where $f_R$ is the desired frequency which would indicate a stationary target;
said input from the combining means being operative to modify the output of the voltage controlled oscillator to produce a frequency $f_T$ equal to $$f_R\left(1 - \frac{2V \cos \theta}{C}\right)$$

a transmit scanner element having an input and an output;
an input to said transmit scanner element being operatively coupled to the voltage controlled oscillator;
wherein the output of the transmit scanner corresponds to $f_T$.

References Cited by the Examiner
UNITED STATES PATENTS

| | | | |
|---|---|---|---|
| 2,408,081 | 9/1946 | Lovell et al. | 235—61.5 |
| 2,438,580 | 3/1948 | Schuck | 340—6 |
| 2,859,433 | 11/1958 | Saxton et al. | 343—8 |
| 2,964,729 | 12/1960 | Beebe et al. | 340—3 |

FOREIGN PATENTS 687,644   6/1964   Canada.

RODNEY D. BENNETT, *Primary Examiner.*

CHESTER L. JUSTUS, *Examiner.*

R. A. FARLEY, *Assistant Examiner.*